United States Patent [19]

Fortin

[11] Patent Number: 5,185,503

[45] Date of Patent: Feb. 9, 1993

[54] APPARATUS FOR ATTENUATING STONELEY WAVES IN A BOREHOLE

[75] Inventor: Jean-Pierre Fortin, Paris, France

[73] Assignee: Campagnie Generale De Geophysique, France

[21] Appl. No.: 800,907

[22] Filed: Nov. 26, 1991

[30] Foreign Application Priority Data

Nov. 27, 1990 [FR] France .................. 90 14795

[51] Int. Cl.$^5$ .................................. G01V 1/40
[52] U.S. Cl. ........................ 181/102; 181/105; 181/122; 367/25; 367/31; 367/911; 175/50; 73/152
[58] Field of Search ............ 367/25, 31, 83, 911; 181/102, 105, 122; 175/50; 73/152

[56] References Cited

U.S. PATENT DOCUMENTS

| | | | |
|---|---|---|---|
| 2,350,371 | 6/1944 | Smith | 367/911 |
| 3,054,471 | 9/1962 | Knudsen | |
| 4,815,049 | 3/1989 | Konrad | |
| 4,858,718 | 8/1989 | Chelminski | 181/106 |

FOREIGN PATENT DOCUMENTS 853978 10/1952 Fed. Rep. of Germany .
57-179777 4/1981 Japan .

Primary Examiner—Nelson Moskowitz
Attorney, Agent, or Firm—Skjerven, Morrill, MacPherson, Franklin & Friel

[57] ABSTRACT

Apparatus for attenuating Stoneley waves propagating in a borehole along a given direction, the borehole containing a fluid in which at least one seismic transducer is immersed. According to the invention, the apparatus comprises pressure transmission means firstly for placing in a region of the borehole where the hydrostatic pressure is not less than the hydrostatic pressure at the level of the seismic transducer, and secondly for transmitting pressure to at least one flexible hose containing a gas, the hose being disposed upstream from the seismic transducer relative to the propagation direction of the Stoneley waves. The apparatus is applicable to geological exploration by performing a seismic survey in a borehole.

16 Claims, 2 Drawing Sheets

APPARATUS FOR ATTENUATING STONELEY WAVES IN A BOREHOLE

The present invention relates to apparatus for attenuating Stoneley waves propagating in a borehole along a given direction, said borehole containing a fluid in which at least one seismic transducer is immersed.

A particularly advantageous application of the invention lies in the field of geological exploration by performing a seismic survey in a borehole.

BACKGROUND OF THE INVENTION

The technique of prospecting by performing a seismic survey in a borehole consists in placing seismic transducers (transmitters and receivers) in a vertical or horizontal borehole, the transducers being capable respectively of transmitting or receiving soundwaves propagating within the geological formations through which the said borehole passes. However, the waves that it is desirable to record are often disturbed by so-called "Stoneley" waves which constitute a particular mode of soundwave propagation due to the presence of the borehole. In general, Stoneley waves propagate inside a borehole or in the proximity thereof, and in a direction that is parallel to the axis of the borehole.

Although numerous digital filtering methods exist to attenuate the influence of these interfering waves, it may be preferable to attenuate the waves in the borehole itself so as to record the desired wave only thus making it possible to use the entire available dynamic range for useful recording.

As described by M. N. Toksöz, C. H. Chen, and M. E. Willis in "Seismic waves in a borehole. A review": Full Waveform Acoustic Logging Consortium Annual Report, 1983, the attenuation factor 1/Q of a Stoneley wave is given by:

$$\frac{1}{Q} = \frac{a}{Q_A} + \frac{b}{Q_b} + \frac{c}{Q_c}$$

where $1/Q_a$ and $1/Q_b$ are the attenuation factors of compression waves and of shear waves respectively in the formation surrounding the borehole, and where $1/Q_c$ is the attenuation factor of compression waves in the fluid in the borehole (water, mud, etc.).

By way of example, FIG. 1 shows how the values of a, b, and c vary as a function of frequency f in a so-called "fast" formation, i.e. where the shear wave propagation velocity $V_S$ is greater than that of compression waves in the fluid. It may be observed that the major coefficient is c. FIG. 2 shows the same parameters for a so-called "slow" formation where $V_S$ is less than the velocity $V_f$ in the fluid. It may be observed that the coefficient c is still the major coefficient at low frequencies.

As a result, if the compression waves are attenuated in the fluid, then the Stoneley waves will also be attenuated not only at any frequency in association with a fast formation, but also at low frequencies even with a slow formation. For a formation that is slow at high frequencies, the attenuation achieved by attenuating the compression waves in the fluid will not be so effective. However, that is of less importance since the Stoneley wave is then less troublesome: first, because it is less excited, and second, because b and $1/Q_b$ are both high so that attenuation takes place anyway.

Thus, the technical problem to be solved by the present invention is to provide apparatus of the kind specified in the preamble that is capable of attenuating Stoneley waves in a borehole by attenuating compression waves in the borehole fluid.

SUMMARY OF THE INVENTION

According to the present invention, the solution to the technical problem posed involves the use of apparatus comprising pressure transmission means, placed in a region of the borehole where the hydrostatic pressure is not less than the hydrostatic pressure at the level of a seismic transducer, for transmitting pressure to at least one flexible hose containing a gas. The hose is disposed upstream from the seismic transducer relative to the propagation direction of the Stoneley waves.

Since the pressure transmitted by the pressure transmission means is not less than the hydrostatic pressure at the location where the hose is placed, the hose remains continuously filled with gas under pressure. The presence of a compressible gas in the fluid has the effect of attenuating compression waves therein as taught in U.S. Pat. No. 1,348,828. With the compression waves in the fluid being attenuated in this way, there is corresponding attenuation in the Stoneley waves.

In order to occupy the inside of the borehole more fully, the hose is preferably spiral-wound. Similarly, since the diameter of the hose governs the frequency range over which waves are attenuated, it is advantageous for the apparatus to include a plurality of hoses of different diameters.

Conversely, to avoid attenuating waves that are to be transmitted or recorded, the apparatus of the invention includes at least one rigid connection tube for placing in the vicinity of the seismic transducer. The connection tube is disposed between the pressure transmission means and the hose, and between two lengths of hose if the hose extends both above and below the seismic transducer.

BRIEF DESCRIPTION OF THE DRAWINGS

The following description given with reference to the accompanying drawings explains what the invention is and how it may be embodied by way of a non-limiting example.

In addition to FIGS. 1 and 2 as described above.

DETAILED DESCRIPTION

Figure 1:
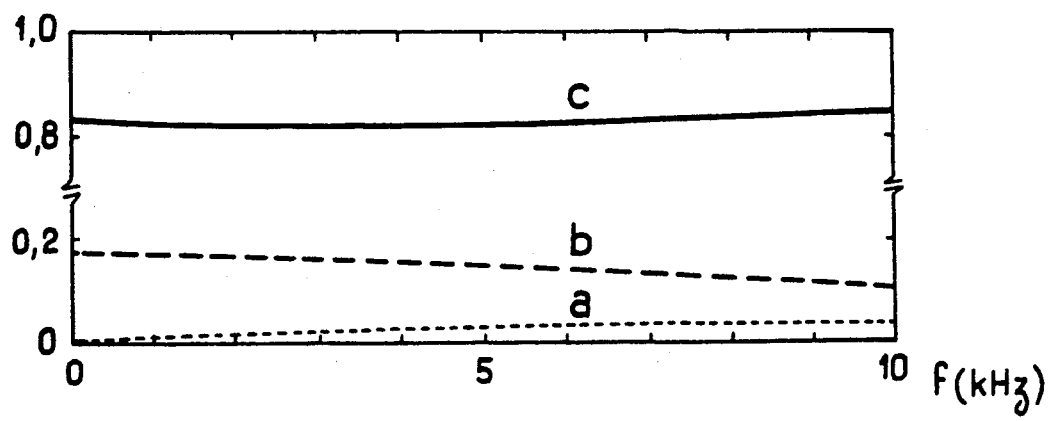
Figure 2:
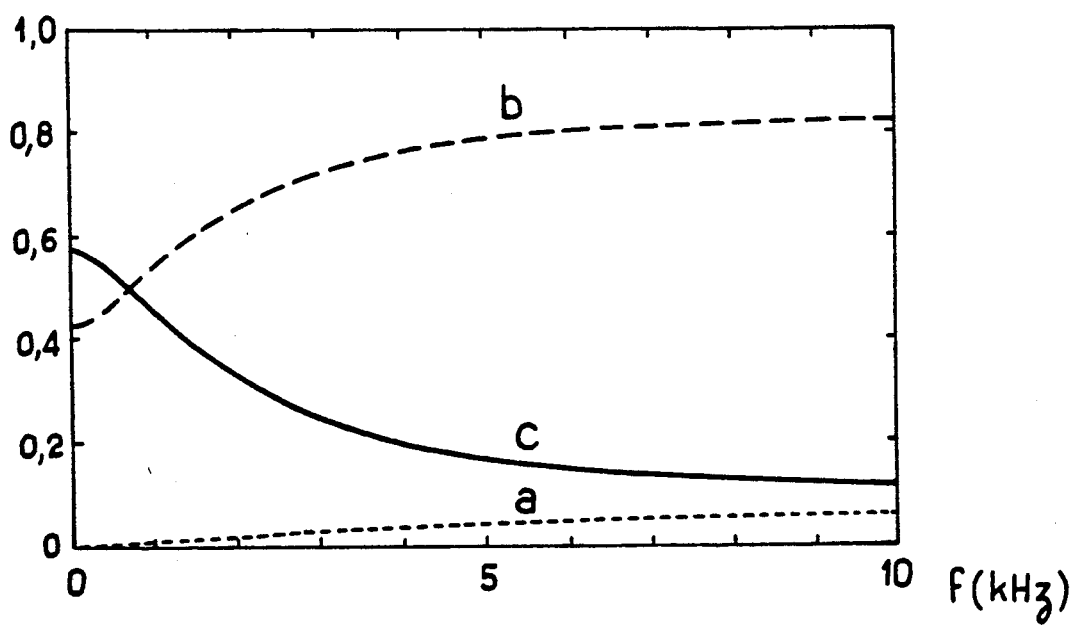
Figure 3:
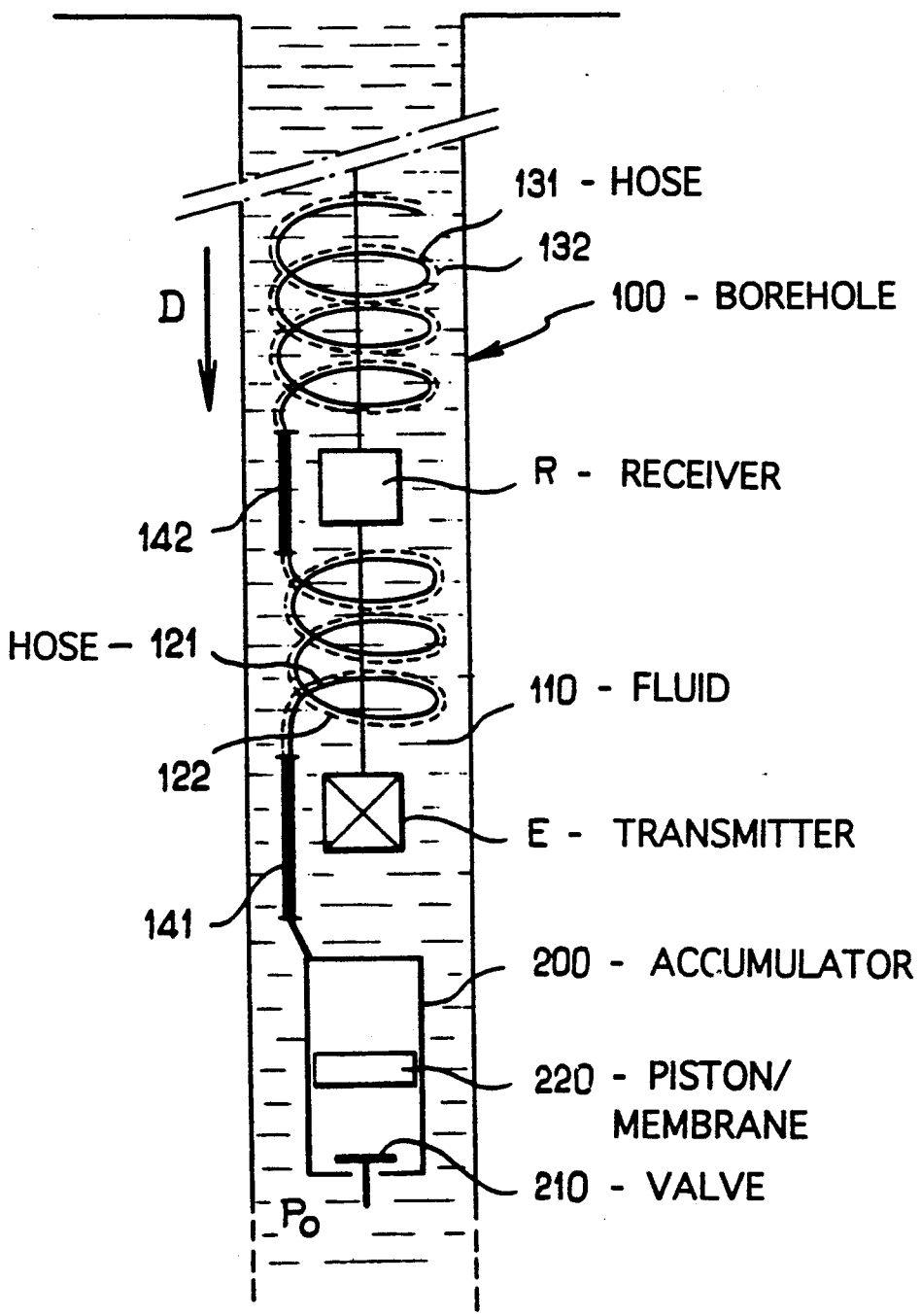
FIG. 3 is a cutaway schematic diagram of an apparatus in accordance with the invention.

FIG. 3 is a diagram of apparatus for attenuating Stoneley waves propagating in a borehole 100 along a given direction D. In the embodiment shown in FIG. 3, the borehole 100 is shown as being vertical, however it could naturally equally well be chosen to be horizontal.

The borehole 100 contains a fluid 110 (water, mud, etc.) in which two seismic transducers are immersed, a transmitter E and a receiver R, for example.

As shown in FIG. 3, the apparatus of the invention includes pressure transmission means 200 for placing in a region of the well 100 where the hydrostatic pressure is not less than the hydrostatic pressure at the transmitter E or at the receiver R. With a vertical well as shown in FIG. 3, this region of higher hydrostatic pressure is situated further down the well 100, at a depth which is greater than the depth of the deepest transducer, in this case the transmitter E. In addition, the pressure transmission means 200 is suitable for transmitting pressure to two sets or lengths of the flexible hoses that contain a gas, e.g. air, each set comprising two different-diameter hoses 121, 122 or 131, 132, which sets or lengths are disposed respectively upstream from the transmitter E and upstream from the receiver R relative to the propagation direction D of the Stoneley waves.

More precisely, the pressure transmission means 200 is constituted by an accumulator which communicates with the hoses 121, 122, 131, 132, said accumulator being provided with a valve 210 that opens when the external hydrostatic pressure is not less than a given pressure Po and that closes again only when the hydrostatic drops below Po. In addition, fluid-tight intermediate means 220 (in this case a free piston), tight relative to the fluid 110, transmits the hydrostatic pressure Po to the hoses in the apparatus. It should be observed that the moving piston 220 could be replaced by a flexible membrane, for example, which is more effective with respect to fluid-tightness.

The accumulator is pre-inflated to the pressure Po, and it may be secured to the seismic transducer equipment. When the entire equipment is lowered down the borehole 100 and reaches a depth where the hydrostatic pressure is equal to Po, then the valve 210 opens. At greater depths, the pressure inside the hoses 121, 122, 131, and 132 thus remains equal to the hydrostatic pressure at the level of the piston 220, thereby preventing the hoses collapsing. Since the pressure of the gas contained in the hoses is at least maintained, the gas can perform its function of attenuating compression waves in the fluid 110, and consequently of attenuating Stoneley waves.

Let P be the maximum pressure in the region under investigation, then Po is chosen so that:

$$Po > \frac{v}{V} P$$

where v is the total volume of the hoses and V is the volume of the supply in the accumulator. For v/v=50, and assuming a depth of 3000 m is to be reached in a fluid of relative density 1, then the pre-inflation pressure should be equal to 6 kg/cm².

It can also be seen in FIG. 3 that the hoses 121, 122, 131, and 132 are spiral-wound so as to occupy the volume inside the borehole as fully as possible.

In addition, in each set of hoses 121, 122 and 131, 132, the individual hoses are of different diameters, thereby enlarging the frequency spectrum over which attenuation takes place. Naturally, an even larger number of different diameter hoses could be used.

Finally, as shown in FIG. 3, two rigid connection tubes 141 and 142 extend respectively between the accumulator 200 and the set of hoses 121, 122, and between the set of hoses 121, 122 and the set of hoses 131, 132 for the purpose of bypassing the transmitter E and the receiver R. This advantageous disposition serves to prevent the hoses attenuating the waves that are transmitted or that are to be recorded.

I claim:

1. Apparatus for attenuating Stoneley waves propagating in a borehole along a given direction, said borehole containing a fluid in which at least one seismic transducer is immersed, wherein said apparatus comprises pressure transmission means firstly for placing in a region of the borehole where the hydrostatic pressure is not less than the hydrostatic pressure at the level of said seismic transducer, and secondly for transmitting pressure to at least one flexible hose containing a gas, said at least one hose being disposed upstream from the seismic transducer relative to the propagation direction of said Stoneley waves and wherein said at least one hose is spiral-wound.

2. Apparatus according to claim 1, including at least one rigid connection tube positioned in the vicinity of said seismic transducer.

3. Apparatus for attenuating Stoneley waves propagating in a borehole along a given direction, said borehole containing a fluid in which at least one seismic transducer is immersed, wherein said apparatus comprises pressure transmission means firstly for placing in a region of the borehole where the hydrostatic pressure is not less than the hydrostatic pressure at the level of said seismic transducer, and secondly for transmitting pressure to a plurality of flexible hoses of different diameters containing a gas, said hoses being disposed upstream from the seismic transducer relative to the propagation direction of said Stoneley waves.

4. Apparatus according to claim 3, wherein said hoses are spiral-wound.

5. Apparatus according to claim 4, including for each hose one rigid connection tube positioned in the vicinity of said seismic transducer.

6. Apparatus according to claim 3, including for each hose one rigid connection tube positioned in the vicinity of said seismic transducer.

7. Apparatus for attenuating Stoneley waves propagating in a borehole along a given direction, said borehole containing a fluid in which at least one seismic transducer is immersed, wherein said apparatus comprises pressure transmission means firstly for placing in a region of the borehole where the hydrostatic pressure is less than the hydrostatic pressure at the level of said seismic transducer, and secondly for transmitting pressure to at least one flexible hose containing a gas, said hose being disposed upstream from the seismic transducer relative to the propagation direction of said Stoneley waves and wherein the pressure transmission means comprises an accumulator communicating with said at least one hose, said accumulator being provided with a valve that opens when the external hydrostatic pressure is not less than a given pressure Po and that closes when the hydrostatic pressure drops below Po, said hydrostatic pressure being transmitted to the at least one hose via fluid-tight free piston tight against said fluid.

8. Apparatus according to claim 7, wherein said at least one hose is spiral-wound.

9. Apparatus according to claim 7, including a plurality of hoses of different diameters.

10. Apparatus according to claim 9, including at least one rigid connection tube positioned in the vicinity of said seismic transducer.

11. Apparatus according to claim 8, including at least one rigid connection tube positioned in the vicinity of said seismic transducer.

12. Apparatus for attenuating Stoneley waves propagating in a borehole along a given direction, said borehole containing a fluid in which at least one seismic transducer is immersed, wherein said apparatus comprises pressure transmission means firstly for placing in a region of the borehole where the hydrostatic pressure is not less than the hydrostatic pressure at the level of said seismic transducer, and secondly for transmitting pressure to at least one flexible hose containing a gas, said at least one hose being disposed upstream from the seismic transducer relative to the propagation direction of said Stoneley waves, the pressure transmission means being constituted by an accumulator communicating with said at least one hose, said accumulator being provided with a valve that opens when the external hydrostatic pressure is not less than a given pressure Po and that closes when the hydrostatic pressure drops below Po, said hydrostatic pressure being transmitted to the at least one hose via a fluid-tight flexible membrane that is tight against said fluid.

13. Apparatus according to claim 12, wherein said at least one hose is spiral-wound.

14. Apparatus according to claim 12, including a plurality of hoses of different diameters.

15. Apparatus according to claim 14 including at least one rigid connection tube positioned in the vicinity of said seismic transducer.

16. Apparatus according to claim 13, including at least one rigid connection tube positioned in the vicinity of said seismic transducer.

* * * * *